May 9, 1939.  H. N. DURHAM  2,157,328
FLUID-PRESSURE-OPERATED GEAR SHIFTER
Filed June 1, 1936  2 Sheets-Sheet 2

INVENTOR
Hobart N. Durham
BY Morgan Finnegan and Durham
ATTORNEYS

Patented May 9, 1939

2,157,328

UNITED STATES PATENT OFFICE 2,157,328

FLUID-PRESSURE-OPERATED GEAR SHIFTER

Hobart N. Durham, Munsey Park, Long Island, N. Y., assignor to Vaco Products, Inc., Jersey City, N. J., a corporation of Delaware Application June 1, 1936, Serial No. 82,817

5 Claims. (Cl. 121—38)

The present invention relates to a novel and improved power operated gear shift transmission, and more particularly to a novel and improved power operated gear shifter particularly adapted for use with synchronized transmissions.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Figure 1:
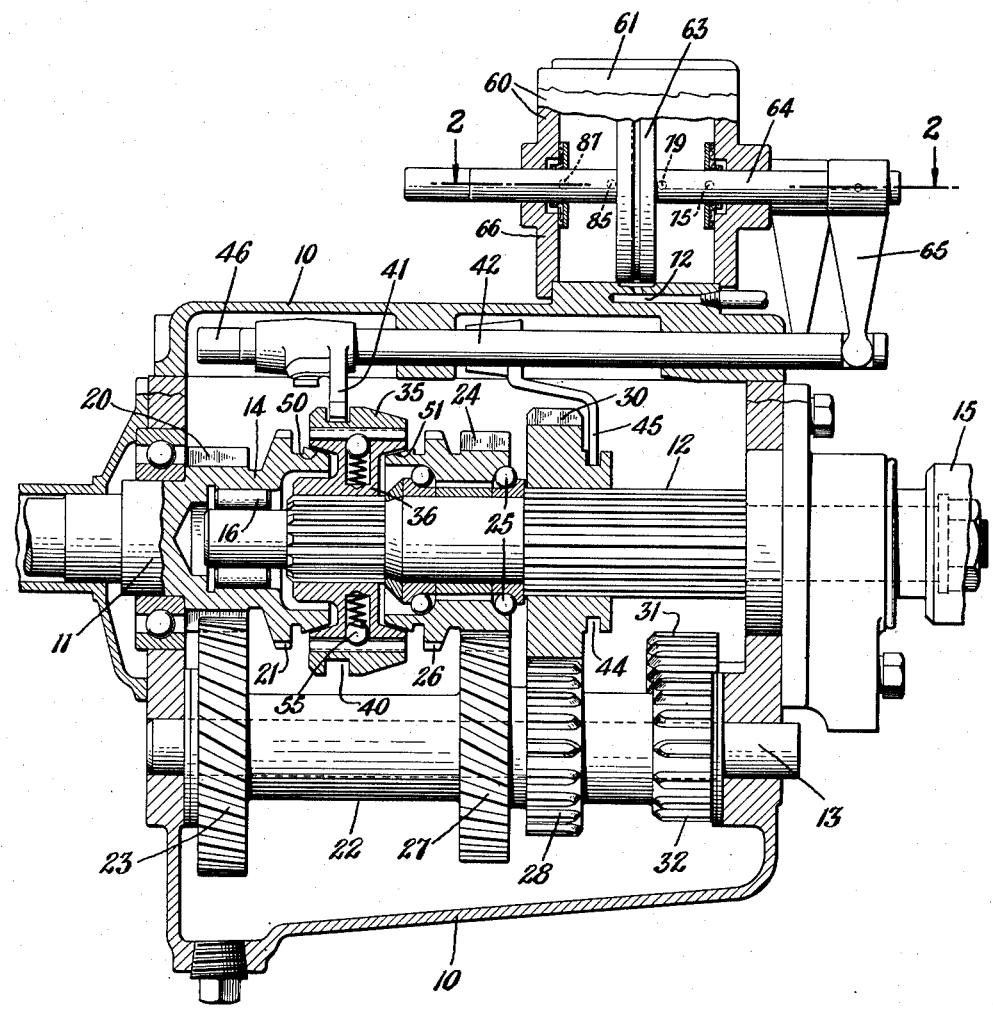
Figure 1 is a vertical section of the synchronized, constant-mesh transmission of an automotive vehicle to which the power gear shifting apparatus of the present invention has been applied.

The present invention has for its object the provision of a novel and improved power-operated change-gear transmission particularly adapted for use with automotive vehicles. Another object of the invention is the provision of a novel and improved fluid-pressure operated gear shifting mechanism adapted for the power shifting of automotive synchronized, constant mesh transmissions which are commonly known as "synchro-mesh" transmissions. A further object of the invention is the provision of a power operated gear shifting device in which means are provided for positively permitting synchronizing of the gears before they are meshed, thereby eliminating clashing of the gears while shifting. Still another object of the invention is the provision of a novel and improved method of regulating the speed of operation of a fluid pressure operated motor which is suitable for use as a power shifting motor.

In the power shifting devices heretofore commonly employed with automotive transmissions of both non-synchronized and synchronized types it has been customary to provide a fluid pressure operated motor having a piston connected to the shifting forks, which piston is moved at a substantially constant rate to shift the gears from one ratio position to another. With such shifting devices applied to the shifting of synchronized transmissions the piston moving uniformly does not give a sufficient opportunity for complete synchronization of the transmission before complete meshing takes place, and either the gears clash on meshing, the synchronizing elements are overloaded, or the piston must operate with undue slowness, thus making the vehicle sluggish in operation. With the present invention, the gearshifting motor first quickly shifts the gears to neutral position, and then pauses slightly in synchronizing position, the period of pause being of sufficient length of time to allow complete synchronization of the gears, after which the gears are again quickly moved into another speed position.

The shifting motor of the present invention may be applied to any of the shifting forks so as to operate as the gears are shifted from any speed to any other speed position, but in three speed and reverse transmissions, the greatest need for the invention is in connection with the shift from third speed into intermediate speed, and from first or low speed into second or intermediate speed, with a lesser need for the definite synchronizing interval in shifting from second into third speed. As in the present embodiment, means are provided for slowing or stopping the motor piston at the synchronizing point of the transmission, and for again applying the operating fluid pressure to the piston after the piston has reached that point.

It will be understood that the foregoing general description and the following detailed description as well, are exemplary and explanatory of the invention but are not restrictive thereof.

Referring now in detail to the illustrative embodiment of the present invention as shown in the accompanying drawings, tne invention is shown as applied to a conventional form of synchronized, constant-mesh automotive transmission in which a synchronizer is available for synchronizing the positive clutches for second and third speeds. As shown, the transmission comprises a transmission housing 10 in which is rotatably journalled the driving shaft 11, the driven shaft 12 and a counter shaft 13. Driven shaft 12 is connected at one end to the universal joint 15 and by it to the propeller shaft (not shown), and at its other end is freely and rotatably mounted within the recessed end 14 of the driving shaft 11 by means of the roller bearing 16.

The driving shaft 11 is formed with a gear 20 and positive clutch teeth 21, the gear 20 meshing with one gear 23 of the multiple gear 22 which is freely rotatable on the counter shaft 13, while the intermediate gear 27 of the gear 22 meshes with the second-speed gear 24 which is freely rotatable by means of ball bearings 25 on the driven shaft 12. Gear 24 is also formed with positive clutch teeth 26.

For first speed and reverse, a gear 30 is slidably splined to the driven shaft 12, and is adapted to be slid into mesh with either the first speed gear 28 of the multiple gear 22 or with the reverse idler 31 meshing with the reverse portion 32 of the multiple gear 22.

Intermediate the clutch teeth 21 and 26 and slidable with respect thereto is an internally splined sleeve 35, slidable on splined collar 36 which in turn is splined to the forward end of the driven shaft 12. The splined sleeve 35 is externally grooved, as at 40, to receive the second and third speed shifter fork 41 which is mounted for sliding movement by means of the shift rod 42. As the shift rod is moved forwardly, the sleeve 35 positively locks the teeth 21 to the driven shaft 12 so that power is applied directly through the transmission, and all of the gears revolve idly. As the shift rod 42 is moved rearwardly, the sleeve 35 engages the teeth 26 so that power is transmitted from the driving shaft 11, through gears 20, 23, 27 and 24 to teeth 26 and through sleeve 35 to the splined driven shaft 12, at a reduced speed which is dependent upon the gear ratios employed. For shifting into and out of first speed and reverse, the gear 30 is formed with a groove 44 into which is fitted the first and reverse fork 45 slidably mounted by means of a shift rod 46.

Means are provided for synchronizing the intermediate and high speed clutches prior to their actual engagement, so as to avoid the clashing of these clutch teeth under many conditions of shifting gears, and for this purpose, the adjacent ends of the clutch members 21 and 26 are formed as clutch cones 50 and 51, adapted to engage with the correspondingly shaped internal clutch faces formed on the faces of splined collar 36. Means are also provided for forcing one or the other of the internal faces into engagement with the corresponding cone 50 or 51 as the sleeve 35 is slid forward or rearwardly, and for this purpose the collar 36 is provided with contained, and resiliently pressed balls 55 which are urged into corresponding depressions on the inner face of the clutch sleeve 35, so that as the sleeve 35 is moved in either direction, the corresponding cone clutch is first engaged to speed up the driving shaft 11 and its associated gears, after which the positive clutch is locked for driving.

Power means are provided for selectively shifting the gears so that power may be transmitted through any one of the sets of gears, and as embodied, these means comprise vacuum or suction operated, double-acting motors connected to the shift rods and selectively energized so that one or the other of the shift rods is moved in one direction or another, dependent upon the gear mesh desired by the operator of the vehicle.

Mounted on the transmission casing 10 are two double-ended cylinders 60 and 61 which may be duplicates of each other, although only the cylinder for second and third speed need be provided with means for slowing down the shifting action during the synchronizing period. Each of these cylinders is provided with a reciprocable piston 63 and piston rod 64 connected by depending arm 65 to its respective shift rod. Thus the piston of cylinder 60 is connected by its arm 65 to rod 42, while the piston of cylinder 61 is connected to the shift rod 46, for the first speed and reverse gears.

Figure 2:
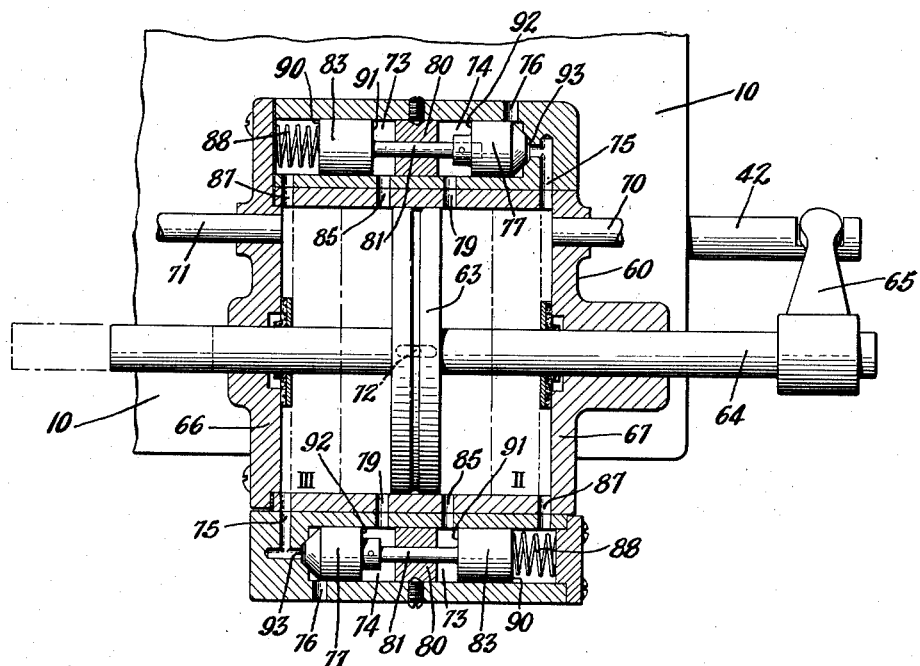
Figure 2 is a horizontal fragmentary sectional view of an illustrative embodiment of the present invention.

The construction of the cylinder 60 is shown in detail in Figure 2 of the drawings and the piston 63 is mounted in the cylinder by means of its piston rod 64 which passes through suitable apertures in the end walls 66 and 67 of the cylinder. Suction may be applied to either end of the cylinder 60 by pipe 70 or 71, or may be applied to the central portion of the cylinder (for neutral) through the neutral ports 72, and pipe 70 corresponds to second speed position, while pipe 71 serves to apply suction for the movement of the piston and gears to high speed position.

In accordance with the illustrative embodiment of the invention, means are provided for selectively admitting air to one end or the other of the cylinder 60, dependent upon which end is subjected to suction, so that as suction is applied to one end of the cylinder, air is admitted to the other end of the cylinder to increase the pressure difference between the two faces of the piston 63. These means also serve to interrupt the admission of air to the cylinder end as the synchronizing clutches engage and thereby provide a definite pause in the piston stroke so that complete synchronization of the transmission may be obtained.

As embodied, the admission of air is controlled by fluid pressure operated valves controlled in their operation by the application of suction to the other end of the cylinder and by the position of the piston in the cylinder. Each of these valves comprises a pair of valve chambers or cylinders 73 and 74 mounted on the side of the cylinder, and axially alined with each other.

At one end of the cylinder 60 is a duct 75 leading from the cylinder end to the valve seat at one end of the cylinder 74, which in turn communicates with the atmospheric duct 76 at one side of the cylinder under control of the frustro-conical end of the valve plunger 77. The main body of the plunger 77 is cylindrical and is fitted within the cylinder 74 which at its other end communicates with the central portion of cylinder 60 through duct 79 so that the pressure in the corresponding portion of the cylinder is applied to the inner end of the plunger. Separating the cylinders 73 and 74 is a web 80 having an aperture therein to receive the rod 81 connecting plunger 77 with the piston 83 which is fitted within the cylinder 73. Piston 83, plunger 77 and rod 81 are all slidable within their respective cylinders and aperture, but are substantially tight therein so as to avoid excessive leakage.

The inner end of cylinder 73 is in communication with the central portion of the cylinder 60 through duct 85, while the outer end of the cylinder 73 is connected to the end of cylinder 60 by duct 87, and plunger 7 is normally held seated against the valve seat by means of the compression spring 88. Ducts 79 and 85 are spaced apart, preferably a distance only slightly more than the thickness of the piston 63, so that either one, but not both ducts, may be closed or restricted by the piston 63. The faces of piston 83 and the inner face of plunger 77 are open to pressure over substantially their whole area, while the reduced end of plunger 77 alone is subjected to the pressure applied through duct 75.

For admitting air to the other end of the cylinder a reversed duplicate of the fluid pressure controlled valving is provided, so that as suction is applied to either end of the cylinder 60 air is admitted to the other end under control of this suction and the position of the piston.

In the operation of this embodiment of the invention, as suction is applied to the cylinder through pipe 71, and with the piston 63 at the right hand end of the cylinder 60 so that the gears are in second speed position, suction is also applied to faces 90, 91 and 92 of the piston 83 and plunger 77, and this force created by this suction exceeds the compression of spring 88 moving the plunger 77 to the left to admit air through ducts 75 and 76 to the cylinder end. Thereupon, the piston 63 moves to the left until it closes off duct 79 and when the piston is in the position shown in Figure 2, the pressure on faces 92 and 93 is substantially equal, while the suction on faces 90 and 91 is substantially equal allowing the plunger 77 to close off duct 75 and thereby check the movement of piston 63 at the synchronizing point. Due to inevitable leakage, the piston 63 moves slowly to the left, finally uncovering port 85 and again unbalancing the pressures so that suction is applied only to face 90, while the pressure on the other faces 91, 92 and 93 is equal, again overcoming the force of spring 88 and opening the duct 75 to atmosphere to permit rapid movement of the piston 63 into third speed position. By suitably choosing the strength of spring 88 and the dimensions of the various parts, the synchronizing interval can be made as long as is desired for the particular conditions to be dealt with.

In shifting from third speed to second speed, the operation is the reverse of that just described; that is, the piston 63 moves from left to right, and the other set of automatic valves is in operation.

Figure 3:
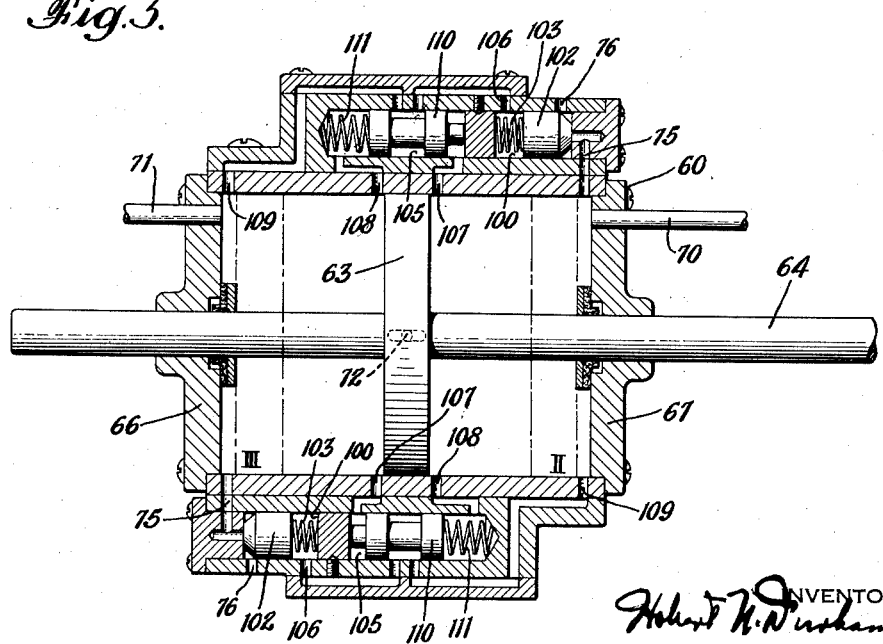
Figure 3 is a similar view of a modified form of the invention.

In the modified embodiment shown in Figure 3 of the drawings, the admission of air to either side of the piston 63 is controlled by a fluid pressure operated valve which is, in turn, controlled by a second fluid pressure operated valve operated in accordance with the fluid pressure at different points along the cylinder 60, and these valves may be reversed duplicates of each other, one for each cylinder end.

As embodied, there is provided a valve chamber 100, at one side of the cylinder 60 in which is slidable a valve plunger 102 urged by spring 103 into position to close the communication between atmospheric ducts 75 and 76. A second valve chamber 105 is also mounted on the cylinder 60 and is provided with ducts 107, 108 and 109 leading directly to the interior of cylinder 60, and with duct 106 connected chambers 105 and 100, and in this valve chamber is a double-ended plunger 110, urged by spring 111 towards the right. Duct 106 communicates with the left end of chamber 100 and the central portion of chamber 105 and may be closed by movement of the plunger 105 against the force of its spring 111, while duct 109 comunicates with the left end of cylinder 60 and the central portion of chamber 105. Ducts 107 and 108 communicate with right and left ends of chamber 105 and with the right and left sides of the piston 63 in neutral or synchronizing position.

When the valve 110 is in the position shown, suction applied to the left end of cylinder 60 may be applied through ducts 109 and 106 to the left end of plunger 102 to unseat the plunger with respect to duct 75 and thereby admit air to the right end of cylinder 60.

In the operation of the embodiment of Figure 3, suction is applied to the cylinder 60 through pipe 71 to move the piston from the right-hand end of cylinder 60 to the left as for shifting from second to third speed. This application of suction, is transferred through duct 109 to duct 106 and to the left-hand end of plunger 102 to unseat the plunger and open the duct 75 to atmosphere, thereby admitting air through these ducts to the right end of cylinder 60. As the piston 63 moves to the left, duct 107 is closed and duct 108 remains open so that plunger 110 moves to the left as the suction is greater on its extreme left end than on its right end. This movement closes duct 106 and discontinues the suction on plunger 102 so that spring 100 will move plunger 102 to close duct 75. This closure of duct 75 slows the piston during the synchronization of the gears at this point in the piston travel, and thereafter on further movement of the piston 63, air is admitted through duct 108 allowing spring 111 to move plunger 110 to the right to open duct 106 and again allow suction to be applied to the left end of plunger 102. In this condition, the movement of the piston is accelerated, and the shifting rod 42 is quickly moved to its final position with the positive clutch fully meshed for driving engagement.

The invention in its broader aspects is not limited to the specific mechanisms shown and described but departures may be made therefrom within the scope of the accompanying claims without departing from the principles of the invention and without sacrificing its chief advantages.

What I claim is:—

1. In a fluid pressure operated motor, the combination of a cylinder having a piston movable therein, a valve operated by the difference in pressure between two ends of the cylinder, means normally tending to close said valve when the pressure difference is reduced, and means operated by the piston for momentarily minimizing the difference in pressure to close said valve.

2. In a suction motor, the combination of a cylinder having a piston movable therein, ducts for applying suction to one end and air to the other end of the cylinder, and means pneumatically controlled by the piston in its movement for momentarily closing one of said ducts to slow the piston in its movement.

3. In a fluid pressure operated motor, the combination of a cylinder having a piston movable therein, ducts connected with opposite ends of the cylinder to create different pressures on different sides of the piston, a valve operated by the pressure in one end of the cylinder and controlling the opening and closing of one of said ducts and a second valve controlled by the piston in certain positions for controlling the operation of the first valve.

4. In a fluid pressure operated motor, the combination of a cylinder having a piston movable therein, ducts connected with opposite ends of the cylinder to create different pressures on different sides of the piston, a valve operated by the pressure in one end of the cylinder and controlling the opening and closing of one of said ducts and a second valve operated by the differences in pressure on opposite sides of the piston in certain positions for preventing the application of pressure to the first valve for slowing the piston as it passes a predetermined point.

5. In a fluid pressure operated motor the combination of a cylinder having a piston movable therein, means operated by a change in pressure in one end of the cylinder for opening the other end of the cylinder to atmosphere, and means operated by fluid pressure in said other end of the cylinder for preventing operation of said first means.

HOBART N. DURHAM.